United States Patent
Price

(10) Patent No.: US 10,925,256 B2
(45) Date of Patent: Feb. 23, 2021

(54) ANIMAL WATERING SYSTEM AND METHOD FOR USING

(71) Applicant: David H. Price, Venice, FL (US)

(72) Inventor: David H. Price, Venice, FL (US)

(73) Assignee: Tidy Dog Pet Products, Knoxville, TN (US)

( * ) Notice: Subject to any disclaimer, the term of this patent is extended or adjusted under 35 U.S.C. 154(b) by 245 days.

(21) Appl. No.: 16/501,060

(22) Filed: Feb. 14, 2019

(65) Prior Publication Data

US 2019/0373853 A1 Dec. 12, 2019

Related U.S. Application Data

(63) Continuation-in-part of application No. 15/998,011, filed on Jun. 8, 2018.

(51) Int. Cl.
*A01K 7/02* (2006.01)
*A01K 7/00* (2006.01)

(52) U.S. Cl.
CPC ............... *A01K 7/02* (2013.01); *A01K 7/005* (2013.01)

(58) Field of Classification Search
CPC . A01K 7/02; A01K 7/005; A01K 7/00; A01K 5/0135; A01K 5/01; A01K 39/02; B65D 41/26

See application file for complete search history.

(56) References Cited

U.S. PATENT DOCUMENTS

| | | | | |
|---|---|---|---|---|
| 4,106,673 | A * | 8/1978 | Donoghue | G01F 11/286 |
| 8,807,083 | B1 | 8/2014 | Ross | |
| 10,064,387 | B2 * | 9/2018 | Burroughs et al. | A01K 7/00 |
| 2007/0079762 | A1 * | 4/2007 | Stephanos | A01K 7/00 |
| 2008/0115732 | A1 * | 5/2008 | Stenberg | A01K 7/00 |
| 2012/0298045 | A1 * | 11/2012 | Wechsler | A01K 7/00 |
| 2019/0216052 | A1 * | 7/2019 | Yang et al. | A01K 7/00 |

* cited by examiner

*Primary Examiner* — Trinh T Nguyen

(74) *Attorney, Agent, or Firm* — Robert J. Lauf

(57) ABSTRACT

A system for providing fluid for an animal includes: a generally oval trough to contain fluid, wherein the vertical inner sides of the trough slope inwardly from the upper rim of the trough to the bottom of the trough at an angle that varies around the circumference of the oval, there is an opening in the bottom of the trough in fluid communication with a dip tube that extends into a partially flexible fluid reservoir, and a means of attachment on the underside of the trough by which the fluid reservoir is sealably attached so that when pressure is applied to the reservoir, fluid will flow upward through the dip tube and fill the trough, and when the pressure is released, any remaining fluid will return to the reservoir.

8 Claims, 16 Drawing Sheets

SECTION A-A

SECTION A-A

SECTION B-B

SECTION A'–A'

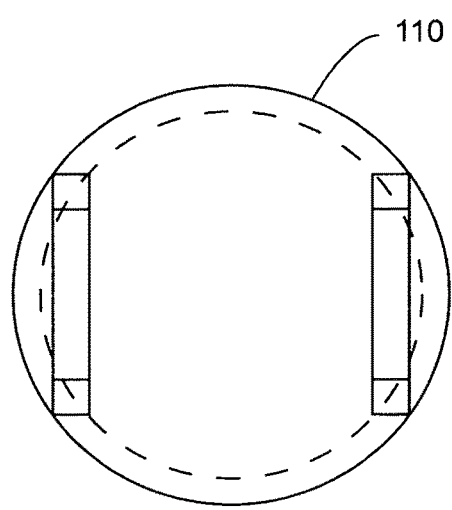
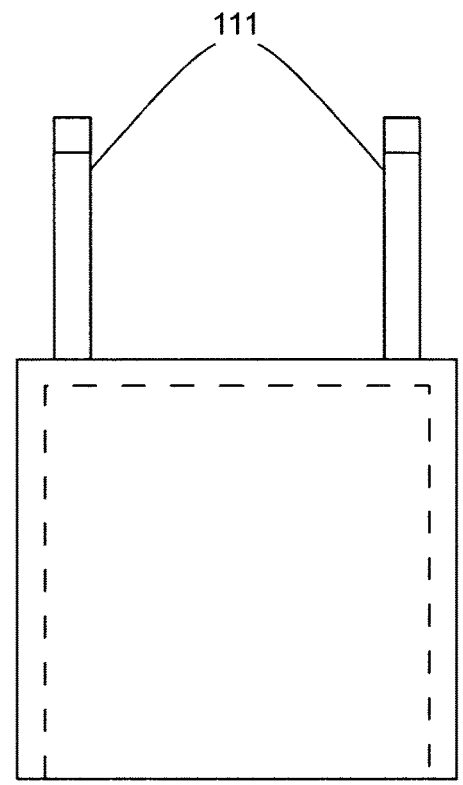
FIGURE 11A
FIGURE 11B

ANIMAL WATERING SYSTEM AND METHOD FOR USING

CROSS REFERENCE TO RELATED APPLICATION

This application is a Continuation-in-Part of U.S. patent application Ser. No. 15/998,011, Animal Feeding Container and Method of Using, filed by the present inventor on Jun. 8, 2018, the entire disclosure of which is incorporated herein by reference.

BACKGROUND OF THE INVENTION

Field of the Invention

The invention pertains to apparatus and methods for watering animals, and more particularly to portable watering bowls that prevent an animal's ears from coming into contact with water.

Description of Related Art

Food and water bowls for domestic animals, particularly dogs, are normally placed on the floor so that the animal can lap the contents conveniently. Unfortunately, veterinarians frequently treat animals for infections or irritation of the ears because they have come into contact with food and/or water.

Various accessories have been developed to address this problem, such as a knitted or flexible snood that the owner can slip over the dog's head to constrain the ears so that they don't drag in the food bowl. The problems with this approach include the fact that it requires the owner to place it on the animal at the time of feeding, and thus can't conveniently accommodate a pet that might eat or drink small amounts randomly throughout the day. It also presents a sanitation problem in its own right because the snood is likely to become soiled and must be periodically cleaned.

There is a similar need, when traveling, to provide a convenient water source for pets. Round travel bowls such as those described in U.S. Pat. No. 8,807,083 to Ross suffer from the same shortcomings as round dog bowls used in the home.

What is needed is a system for watering pets that is adaptable to a wide range of animals, is easily cleaned, and prevents the animal's ears from coming into contact with water.

Objects and Advantages

Objects of the present invention include the following: providing a portable watering bowl that prevents an animal's ears from hanging into the water; providing a portable watering bowl that works together with an animal's natural behavioral patterns when drinking; providing a watering bowl having its own water reservoir, that is easily manufactured by low-cost methods; and providing a method for watering domestic animals that is sanitary and can be used in a vehicle without spillage. These and other objects and advantages of the invention will become apparent from consideration of the following specification, read in conjunction with the drawings.

SUMMARY OF THE INVENTION

According to one aspect of the invention, a container for holding water for an animal comprises:

a vessel having a generally oval plan forming a trough to contain fluid for consumption by an animal, wherein the vertical inner sides of the trough slope inwardly from the upper rim of the trough to the bottom of the trough at an angle that varies around the circumference of the oval, and further comprising:
 an opening in the bottom of the trough in fluid communication with a dip tube that extends into a flexible fluid reservoir;
 an attachment means on the underside of the trough by which the fluid reservoir is sealably attached so that when pressure is applied to the reservoir, fluid will flow upward through the dip tube and fill the trough, and when the pressure is released, any remaining fluid will return to the reservoir.

According to another aspect of the invention, a method for watering an animal comprises the steps of:

a) forming a trough having a generally oval shape whose minor axis is less than the distance between a selected animal's ears, and whose major axis is at least 125% of the minor axis, wherein:
 the vertical inner sides of the trough slope inwardly from the upper rim of the trough to the bottom of the trough at an angle that varies around the circumference of the oval;
 an opening is provided in the bottom of the trough in fluid communication with a dip tube that extends into a flexible fluid reservoir;
 a means is provided on the underside of the trough by which the fluid reservoir is sealably attached so that when pressure is applied to the reservoir, fluid will flow upward through the dip tube and fill the trough, and when the pressure is released, any remaining fluid will return to the reservoir;

b) placing fluid to be consumed by the animal into the reservoir;

c) applying pressure to the reservoir to displace fluid into the trough;

d) positioning the trough so that the animal will approach the trough from a direction parallel to the long axis of the oval and consume fluid therefrom; and, e) releasing pressure on the reservoir so that unconsumed fluid will return to the reservoir.

According to another aspect of the invention, a system for providing fluid for an animal may comprise:

a vessel having a generally oval plan forming a trough to contain fluid for consumption by an animal, wherein the vertical inner sides of the trough slope inwardly from the upper rim of the trough to the bottom of the trough at an angle that varies around the circumference of the oval, and further comprising:
 an opening in the inner wall of the trough in fluid communication with an opening in the bottom of a substantially rigid fluid reservoir; and,
 an attachment means on the trough by which the fluid reservoir is sealably attached so that fluid will flow downward from the reservoir and fill the trough until the fluid level covers the opening in the trough, and fluid will flow downward to replenish the trough whenever the fluid level falls below the opening in the trough.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIG. 10A shows the trough in position for use in watering an animal. FIG. 10B shows the trough in the storage position.

FIG. 11A-B is a schematic diagram of an adapter to allow a canteen-shaped reservoir to be held securely in a cup holder. FIG. 11A is a plan view and FIG. 11B is a side view FIG. 12A is a side view and FIG. 12B is a front view

DETAILED DESCRIPTION OF THE INVENTION

The invention comprises a food or water bowl 1 that includes a trough formed in a generally oval shape, when viewed from above, and further has an integral cantilevered handle 2 extending outward from the upper surface in a direction parallel to the major axis of the oval. The inner sides of the trough slope inwardly from top to bottom, meeting the rounded bottom of the trough tangentially to eliminate corners in the bottom where food may become trapped. The outer sides of the bowl preferably slope outwardly at a selected angle $\theta_1$ relative to vertical so that the base of the oval that rests on the floor is somewhat larger than the top of the bowl, to provide greater stability. Small feet or pads 3 having a friction surface may be disposed at selected points on the bottom surface to grip the floor and minimize sliding.

Despite its relative simplicity of design, the inventive bowl incorporates features that Applicant has developed by a careful study of dog behavior. These features have been found to be surprisingly effective at eliminating food and water in the animal's ears, while at the same time the system is intuitively accepted by the animal because it works in concert with the animal's natural behavior, as will be shown in the examples that follow.

EXAMPLE

Figure 1:
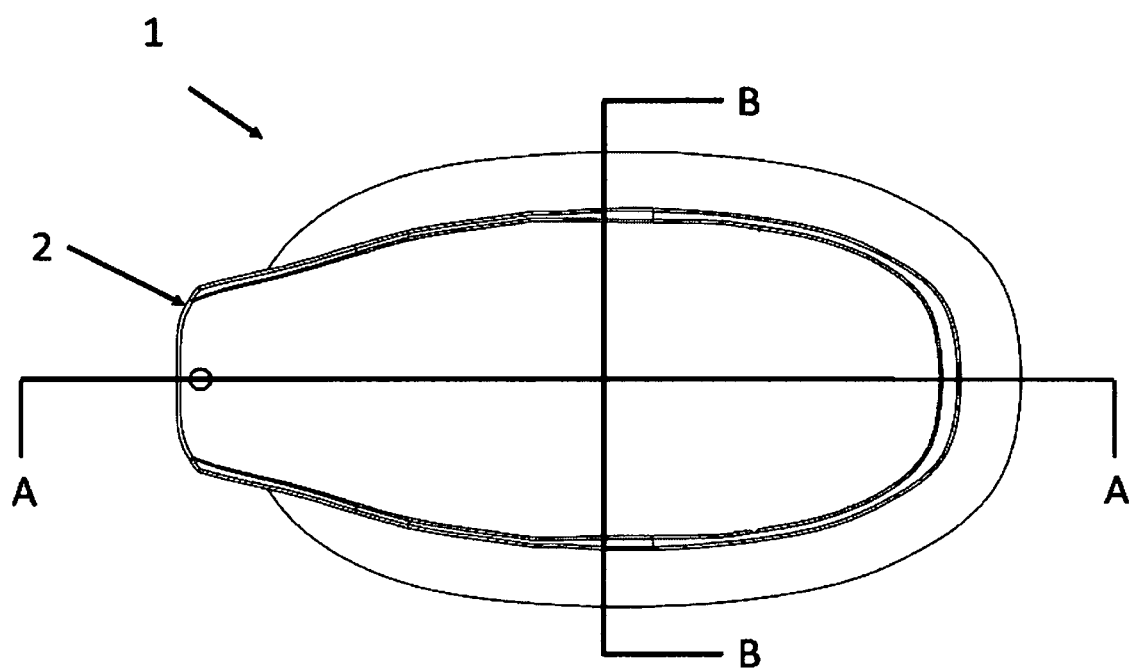
FIG. 1 is a schematic diagram of one example of the present invention, shown in plan view.

FIG. 1 shows an example of the invention, viewed from the top. In plan, the bowl is oval in shape; the length along the major axis, i.e., parallel to line A-A is preferably about 150-200% of the width along the minor axis, i.e., parallel to B-B, but the exact value can vary somewhat. For instance, if the animal is very large, so that a larger overall bowl is needed, the ratio might be reduced (say, to 125%) so that the bowl won't be inconveniently long. Conversely, for very small dogs, a more elongated bowl (with a ratio of at least 200%) may be preferred.

EXAMPLE

Bowl 1 contains an integral or unitary handle 2, which is cantilevered outwardly on one end of the oval and extends in the direction of the major axis. The handle preferably has a convex lower surface and a concave upper surface, so that it will rest comfortably in the user's grip with the fingers under it and the thumb above it. The underside of the handle may further have a textured surface to improve the user's grip. Handle 2 serves several purposes. First, it allows the user to hold the bowl horizontally while it is full and place it on the floor without tipping. Second, the user can use the bowl as a scoop to retrieve a set amount of dry food from a large container. Third, Applicant has discovered that the handle provides another crucial function, viz., it directs the animal to approach the bowl from the end rather than from the side. Applicant has observed this behavior repeatedly, with no training or intervention from the user, and Applicant speculates that the inventive design triggers an instinctive behavior in the animal.

EXAMPLE

Figure 2:
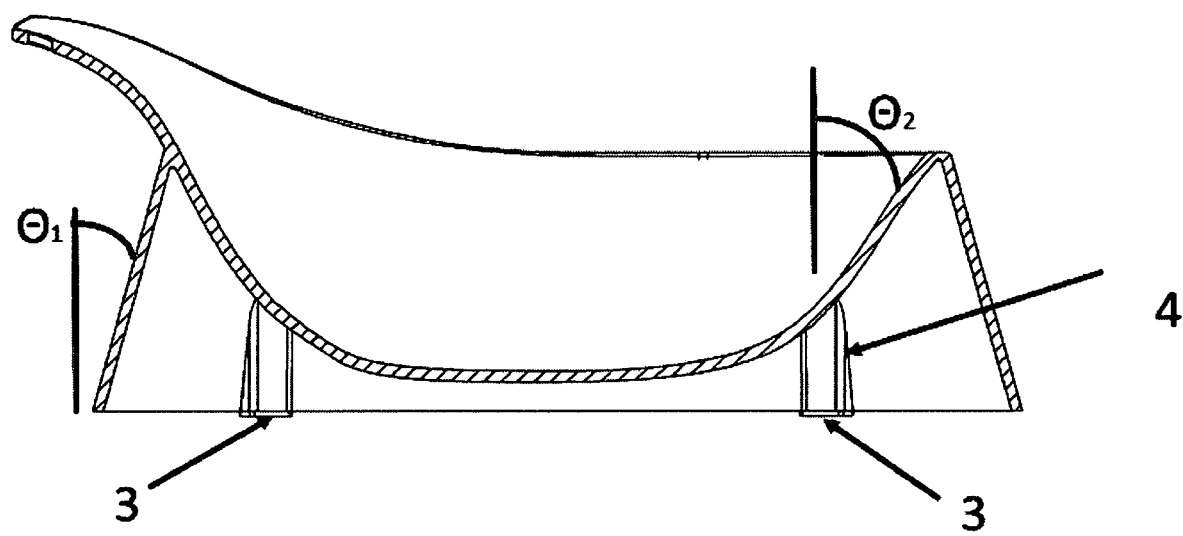
FIG. 2 is a schematic diagram of the example in FIG. 1, shown in cross section along A-A.

FIG. 2 shows a side view in cross-section along A-A of the bowl shown in FIG. 1. One can see that the outer surfaces preferably slope outwardly from top to bottom by a selected angle from the vertical $\theta_1$ to enhance the stability of the bowl by creating an expanded footprint on the floor. At the same time, the inner sides of the trough slope inwardly from top to bottom to eliminate interior corners in which food may become trapped. The bottom of the trough is curved, rather than flat, so that the contents of the bowl will gravitate toward the center as material is consumed. Also, the inwardly-sloping sides meet the curved bottom as a smooth tangent to eliminate any corners where material might collect.

EXAMPLE

Figure 3:
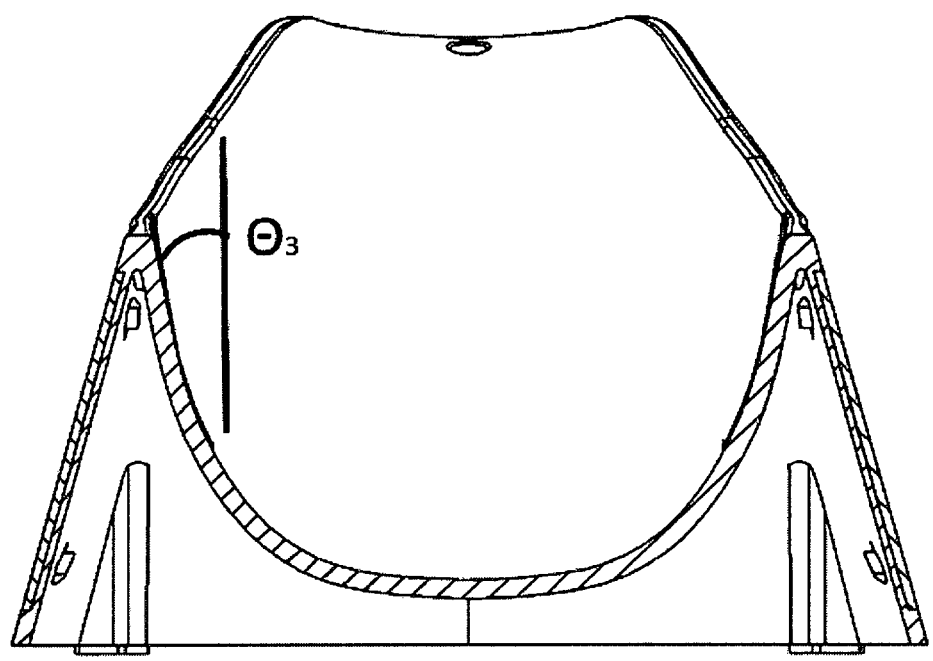
FIG. 3 is a schematic diagram of the example in FIG. 1, shown in cross section along B-B.

FIG. 3 shows an end view in cross section along B-B of the bowl shown in FIG. 1. Comparing FIGS. 2 and 3, it can be seen that in this case, the inward slope of the trough varies around the circumference of the oval, such that the inner wall is somewhat more steeply sloped $\theta_3$ on the sides of the oval and more gradually sloped $\theta_2$ on the ends of the oval. Applicant has discovered that this shape also works interactively with the animal's natural behavior, as dogs and cats tend to lap the food or water and generally push forward while doing so. Thus, the animal moves forward, consuming the food, lapping more or less parallel to the more steeply sloping side walls. As the remaining food decreases, the animal instinctively pushes it up against the more gradually sloping surface at the narrow end of the oval opposite the handle, making it easier to consume the remaining bits of food.

EXAMPLE

Figure 4:
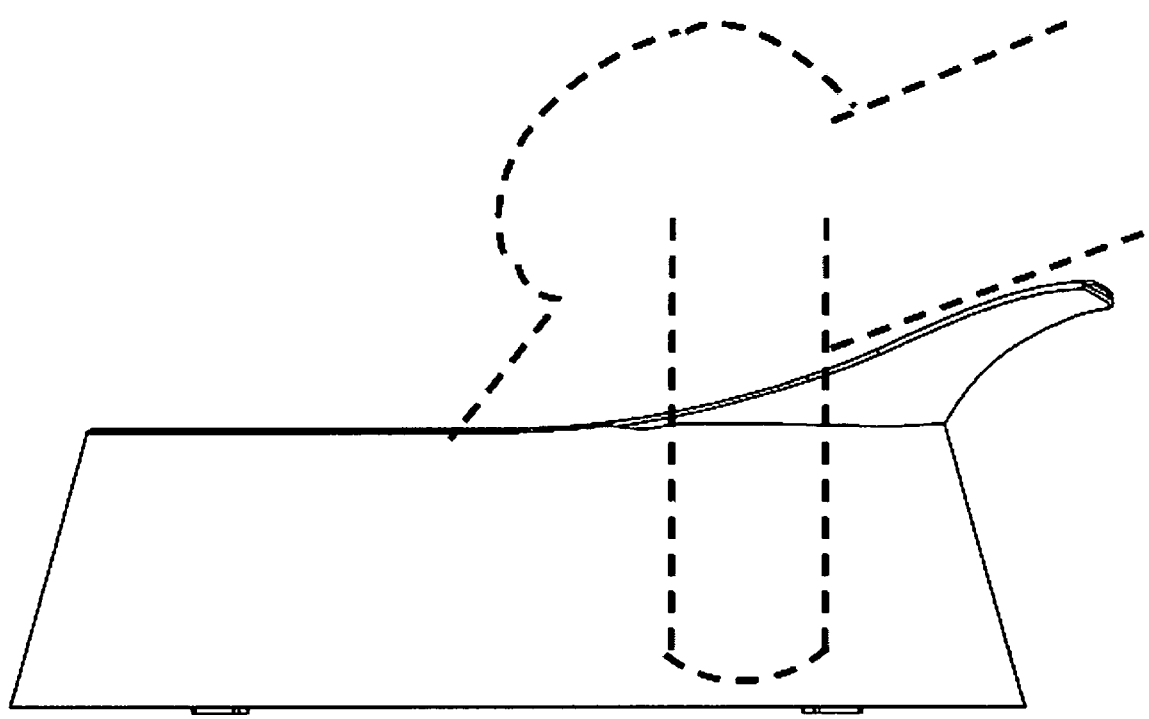
FIG. 4 is a schematic diagram of the invention in use.
Figure 5:
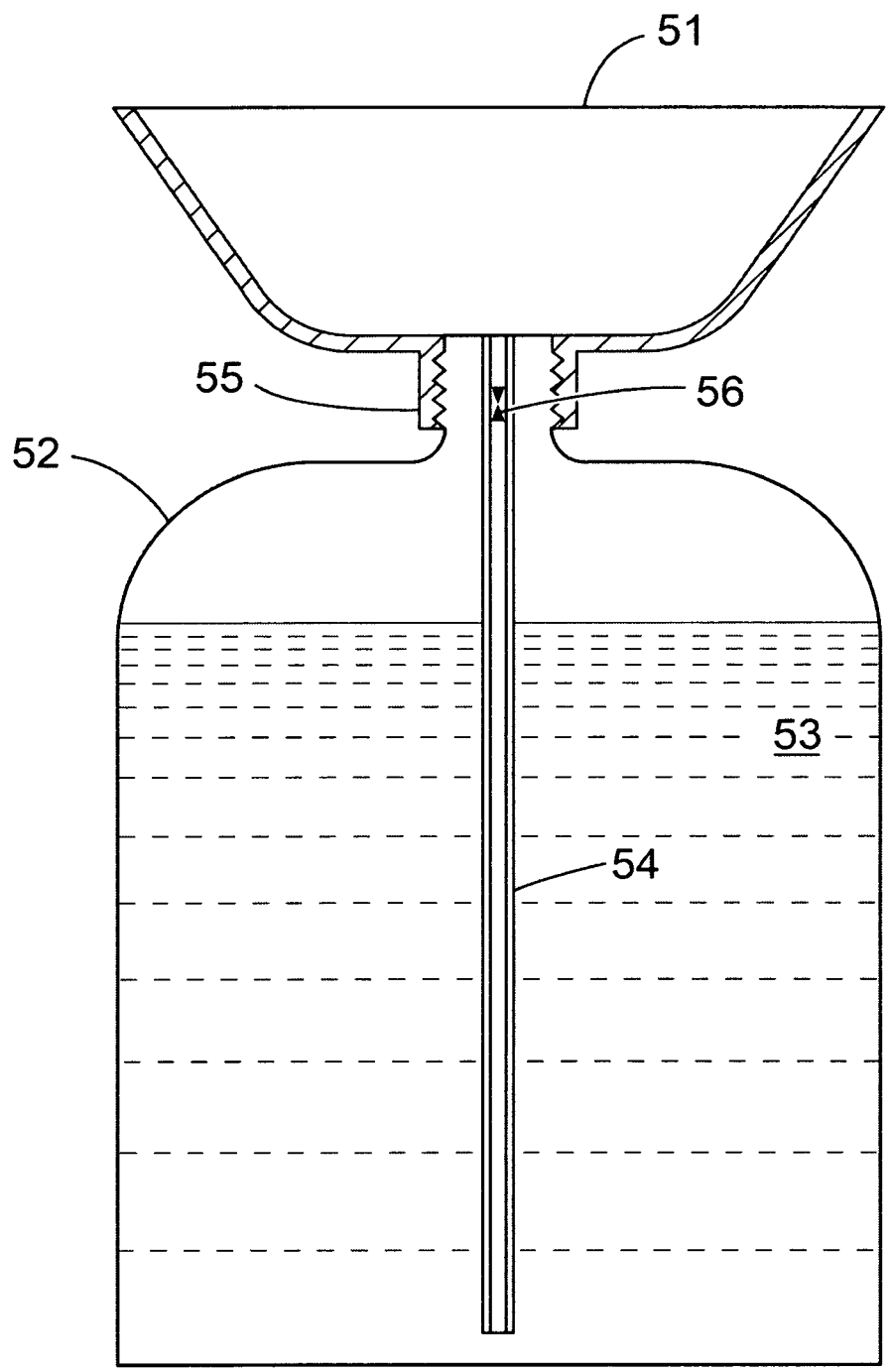
FIG. 5 is a schematic diagram of another example of the invention, configured as a portable watering system.

It will be appreciated that the invention works, in part, because of the relationship between the size of the bowl and the size of the animal. It is important that the narrow dimension of the bowl must be less than the distance between the animal's ears, so that the ears hang down on either side of the bowl and therefore are not in contact with the contents. Thus, Applicant contemplates that the bowl will be offered in various sizes to accommodate correspondingly larger or smaller animals. A bowl sized appropriately for a particular animal will have a minor axis that is narrower than the spacing of the ears. One convenient guideline is to select a bowl that is approximately as wide (in the narrow dimension or minor axis) as the spacing of the animal's eyes. This will insure that the ears straddle the bowl and don't hang into it, as indicated by the dashed outline of the animal in FIG. 4.

EXAMPLE

A bowl with the inventive design was configured for a small dog. In this case, the dog's head was about 8 cm wide, and the bowl dimensions were selected to be about 8×14 cm. The bowl was about 6 cm tall and the handle was about 5 cm long and 5 cm wide.

It will be appreciated that larger dogs will require larger bowls. Applicant contemplates that three sizes of bowls will accommodate most types of dogs. The small bowl just described holds about 12-16 fluid ounces of food or water, a medium bowl might hold about 24-28 fluid ounces, and a large bowl might hold 34-36 fluid ounces. Marks or fill lines may be formed on the inner surface, as ridges or indentations, for the convenience of the user. Corresponding indicia may be provided to indicate volumetric measures (fluid ounces, mL, or the like); alternatively, one fill line for food and a second fill line for water might be provided if the ideal amounts of food and water for the same animal are different.

EXAMPLE

As previously noted, the particular values of dimensions and angles $\theta_1$, $\theta_2$, and $\theta_3$, may be varied somewhat to accommodate animals of various sizes, as well as for aesthetic reasons or for considerations such as optimal draft angles for injection molding.

The method of using the invention, as noted above, appears to trigger certain aspects of an animal's instinctive behavior. Specifically, by placing the bowl on the floor and orienting it perpendicular to a wall or other vertical surface (e.g., the front of a kitchen cabinet, appliance, etc.), Applicant has observed that the animal will quickly learn to approach it from the direction of the cantilevered handle as shown generally in FIG. 4. The exact reason for this behavior is not known with certainty; however, Applicant speculates that perhaps the animal finds it annoying to have one ear rubbing against the cantilevered handle when trying to feed from the side of the bowl instead of the end. An alternate explanation is that the animal finds it more efficient to consume the food when moving parallel to the long axis of the trough. Yet another possible explanation is that the handle makes it convenient for the owner to place the bowl perpendicular to a wall or other vertical surface, and the animal has a natural tendency to approach the bowl in the same direction so that the animal can push forward while feeding and the bowl will be supported by the wall to prevent it from moving away from the animal.

Applicant has further observed that a relatively small animal (e.g., a dachshund or toy dog) will actually straddle the bowl with its legs (not just the ears) and essentially walk forward while consuming the food therein. As noted above, this explains why a bowl configured for a smaller dog might have a larger aspect ratio (say, 200%) compared to a bowl intended for a much larger dog (say, 125%).

EXAMPLE

The surprising effectiveness of the invention in preventing infections has been demonstrated by Applicant in prototype tests. A small dog (poodle) had periodically developed infections from food or water in the ears, which typically required veterinary treatment about once or twice a year. When extensive tests were done using the inventive bowl to provide food and water, the animal had no infections occur in three years of feeding. Given that the dog was fed twice a day, this represents over two thousand uses of the bowl without a single ear infection.

It will be appreciated that the bowl may be made from any convenient material and by any convenient process. The example shown in FIGS. 1-3 is designed to be made by conventional injection molding using a thermoplastic such as polyethylene, polypropylene, PTFE, etc. Dye may be added to make an injection molding of any selected color. The injection molded part may contain a substantially hollow base, as shown in the cross-sectional drawings, in order to reduce cost and eliminate unnecessary material, but that feature is not critical for the functioning of the invention as described. Other optional features may be added as described in the following examples.

EXAMPLE

The inventive bowl can be adapted to form a drinking trough 51 that is fitted to the top of a container 52 and filled by squeezing the container as shown generally in FIGS. 5-10. In this example, the trough again has a generally oval outline, FIG. 6, with an inner surface defined by walls that slope more steeply on the sides and more gradually on the ends as shown in cross section in FIGS. 7-8.

Container 52 must be at least partially flexible. It will preferably have sufficient flexibility so that a user can gently squeeze with one hand and displace a usable amount of fluid 53 into the trough, and will preferably have sufficient elasticity so that, when released, it will return to its original shape. Fluid 53 is conveyed via dip tube 54 that extends to the bottom of the container.

A threaded boss 55 may be formed on the underside of trough 51 to allow a seal to be formed between trough 51 and container 52.

Once the container is in use and at least some of the fluid has been consumed, if the container is tipped over very little fluid will spill out because the dip tube will no longer be submerged. It will be appreciated, however, that leakage may be further minimized or prevented, if desired, by adding a valve 56 or other closure device in the fluid line. Ball valves, slide valves, and other such devices are familiar in the industry and many have been adapted to food and drink containers. The skilled artisan may therefore incorporate any such conventional features in order to optimize the invention for a particular use.

It will be appreciated that the various Figures illustrate some ways of arranging the components of the invention; however, many variants can easily be implemented by the skilled artisan for particular uses, for reasons of manufacturability, etc. For example, when threaded connections are shown it will be understood that the inventive principle applies whether one particular component has the male thread or the female thread, and furthermore that in some cases a threaded connection may be replaced by a press fit, an adhesive bond, a weld bond, etc. as are well known in the art.

EXAMPLE

Figure 6:
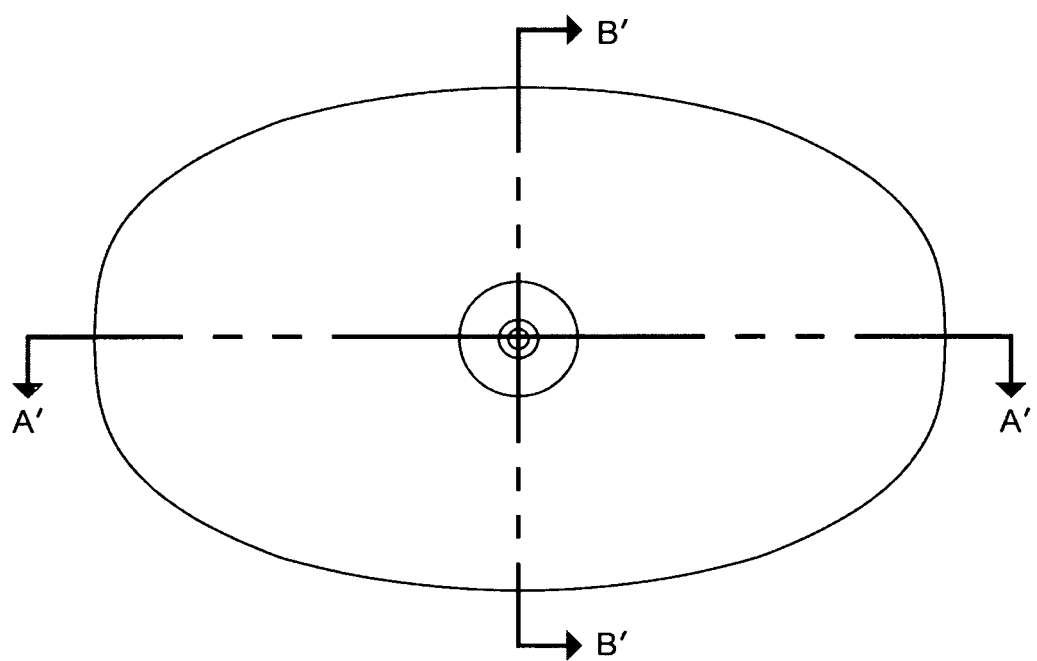
FIG. 6 is a schematic diagram of the example in FIG. 5, viewed from the top.

FIG. 6 shows a plan view of the trough as seen from the top, with the underlying container hidden underneath in this case.

Figure 7:
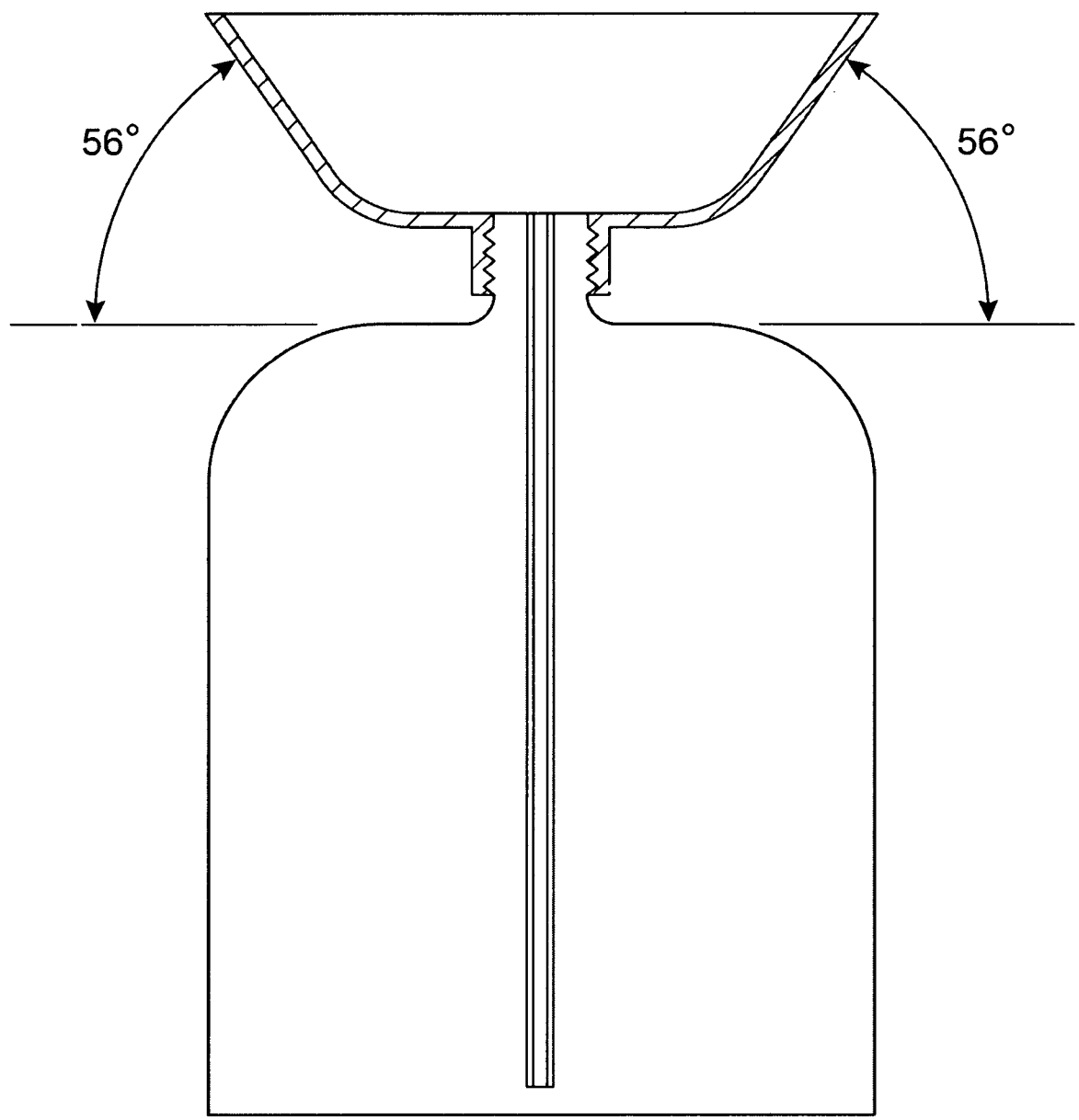
FIG. 7 is a schematic diagram of the example in FIG. 5, shown in cross section along A'-A'.
Figure 8:
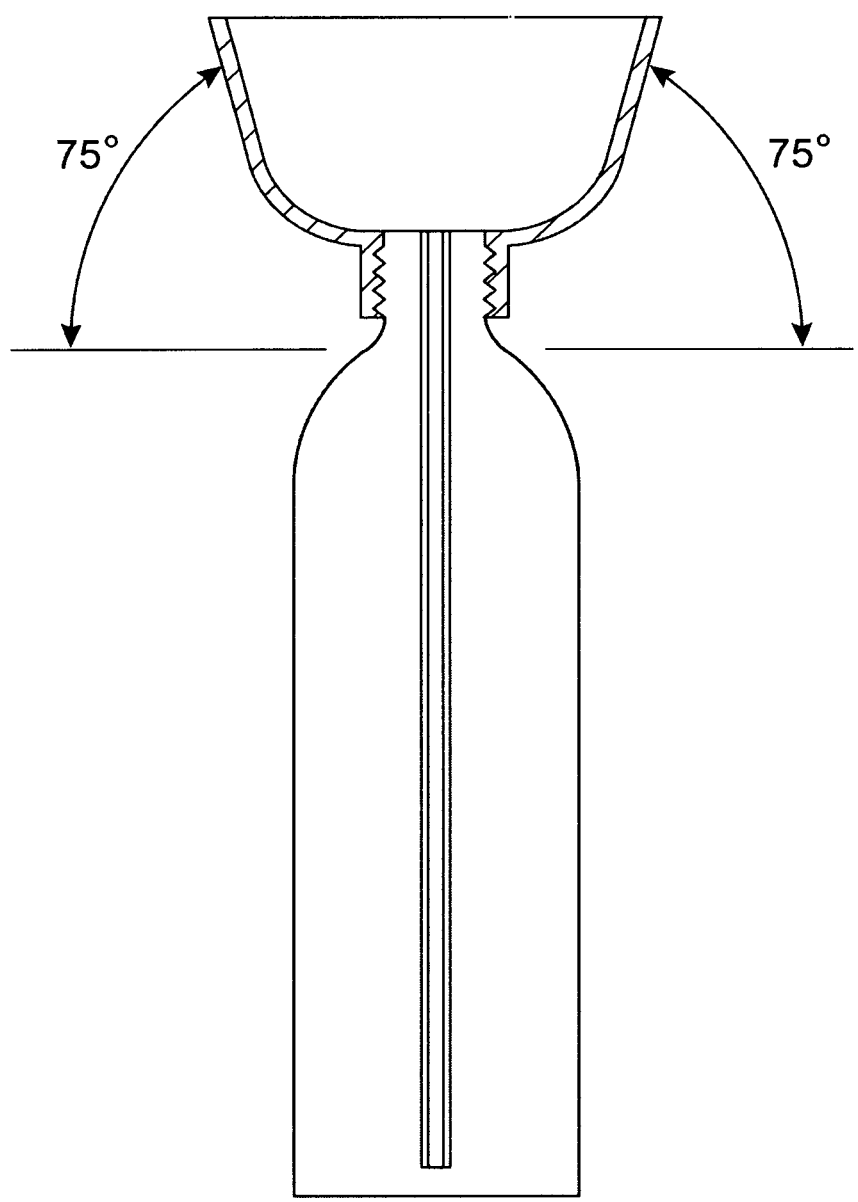
FIG. 8 is a schematic diagram of the example in FIG. 5, shown in cross section along B'-B'.
Figure 9:
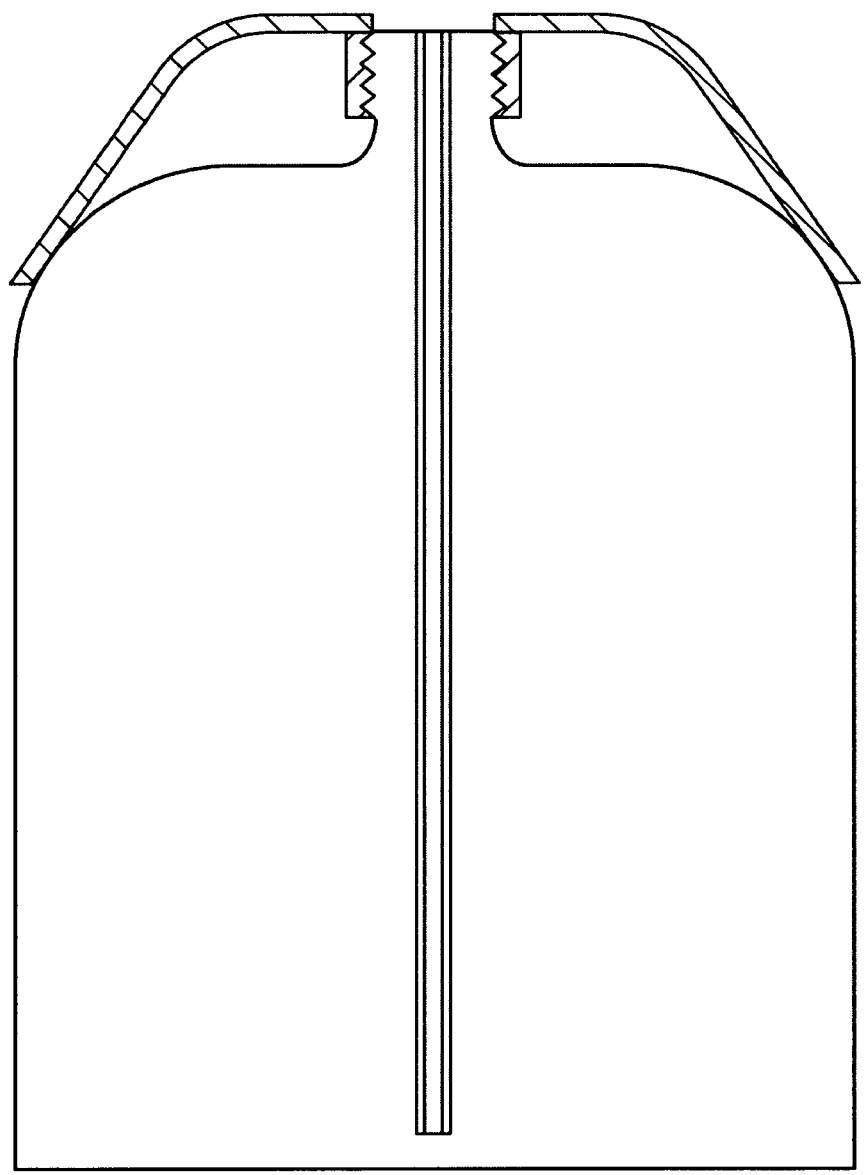
FIG. 9 is a schematic diagram of the example in FIG. 5, shown in side view, to illustrate how the flexible trough can be flipped down for more compact storage.
Figure 10A:
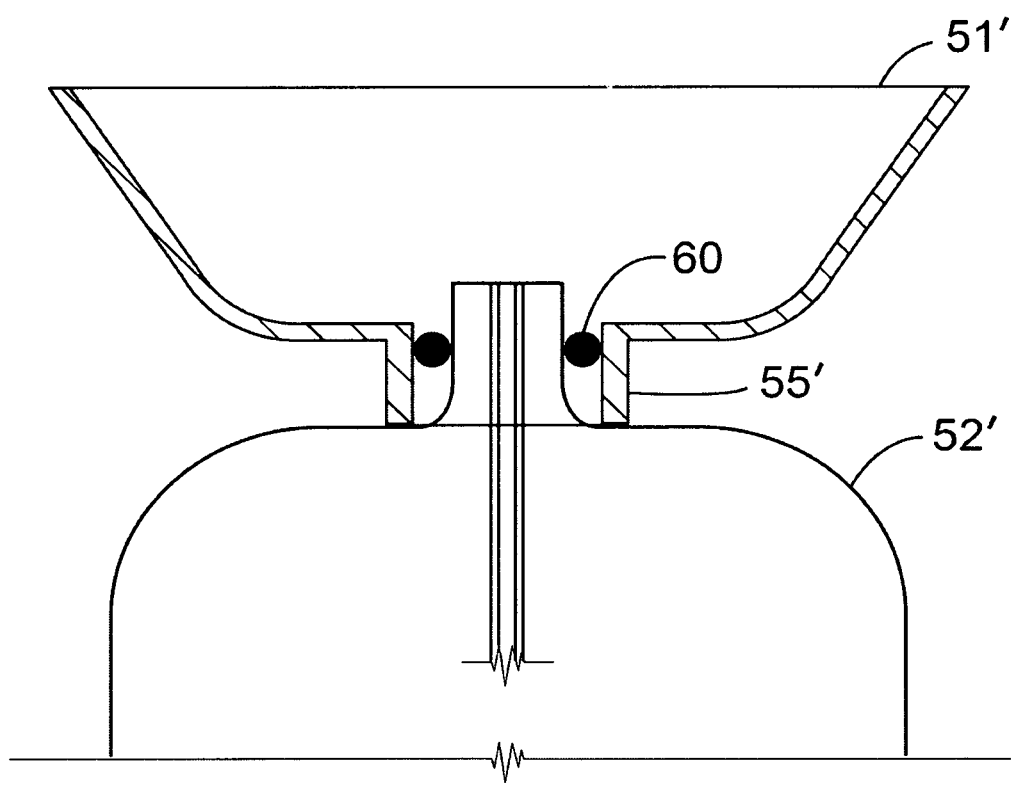
FIG. 10A-B is a schematic diagram of another example of the invention, in which the trough is rigid.
Figure 10B:
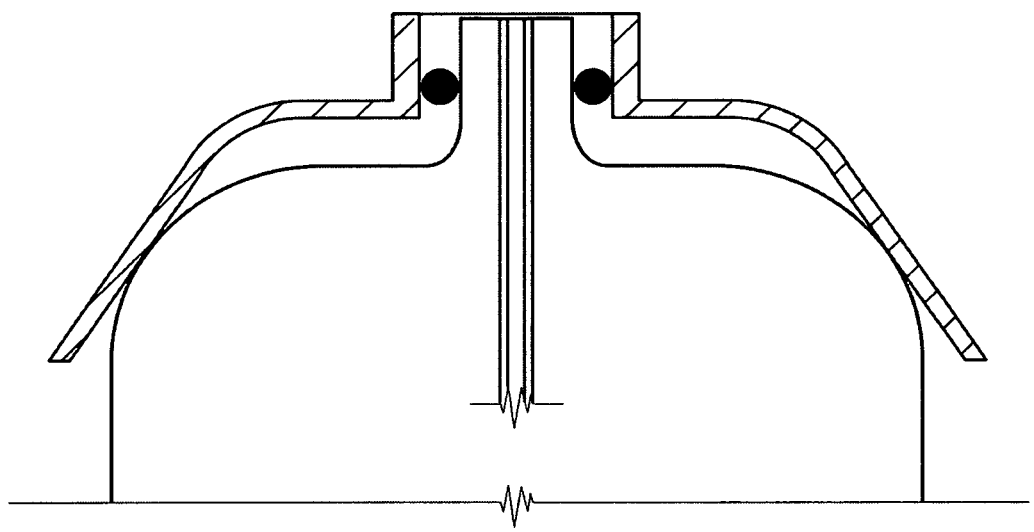

FIGS. 7-8 show exemplary angles in which, as in the aforedescribed feeding bowl, the walls of the trough have a steeper slope on the sides of the oval and a shallower slope on the ends of the oval, and form a tangent to the curved bottom portion, thereby eliminating internal corners.

EXAMPLE

Because the bowl is inherently ovoid in shape, a canteen- or flask-shaped bottle may be used as the reservoir. A flask shape allows particular flexibility when the user applies pressure to the broad sides, while the narrow sides provide structural rigidity. If bowl 51 is made from a flexible elastomer, it can be flipped down when not in use, covering the shoulders of the flask for compact stowage, as illustrated schematically in FIG. 9.

EXAMPLE

Alternatively, the bowl or trough 51' may be substantially rigid and include a boss 55' with a smooth inner surface that engages an O-ring 60 on the circumference of the top stem of reservoir 52'. When not in use, the trough can be removed, turned upside down, and slipped back onto the O-ring for compact storage, as shown schematically in FIGS. 10A-B.

EXAMPLE

Figure 12A:
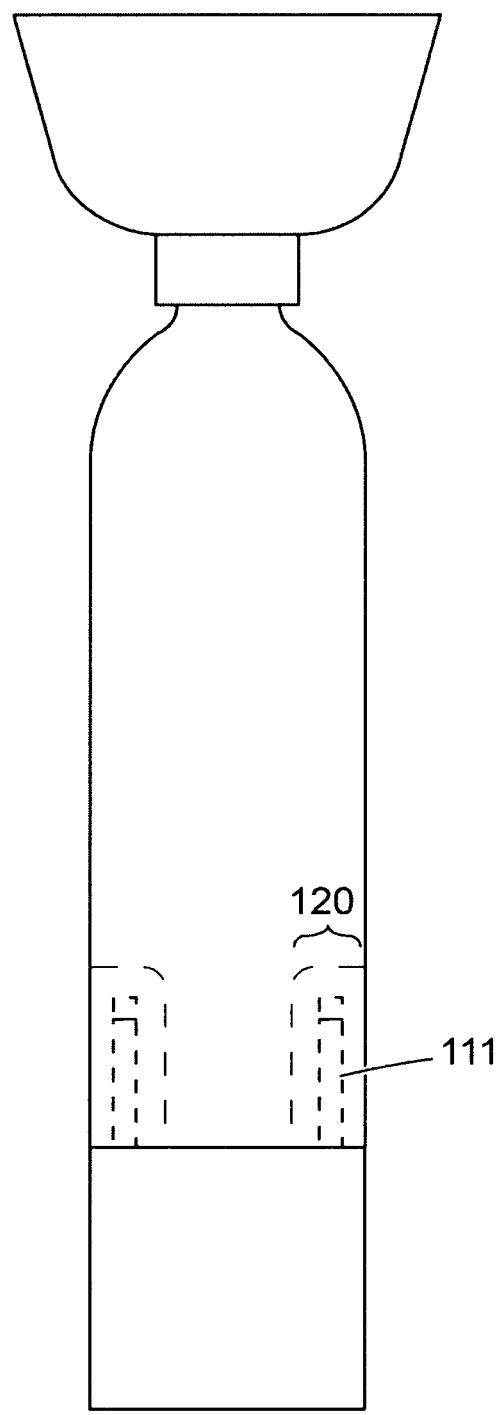
FIG. 12A-B illustrates schematically an example of the invention in which the fluid reservoir is configured to securely engage the adapter of FIG. 11.
Figure 12B:
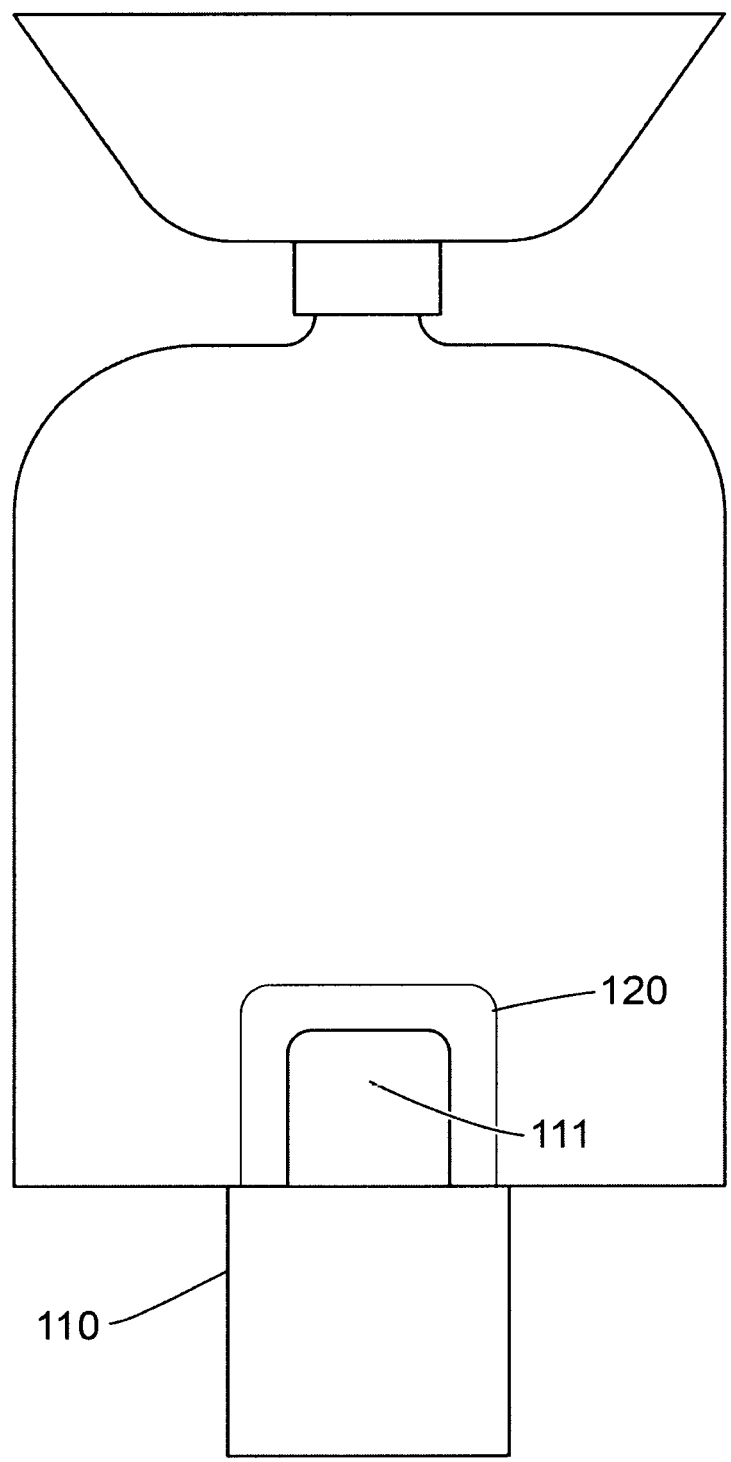
Figure 13:
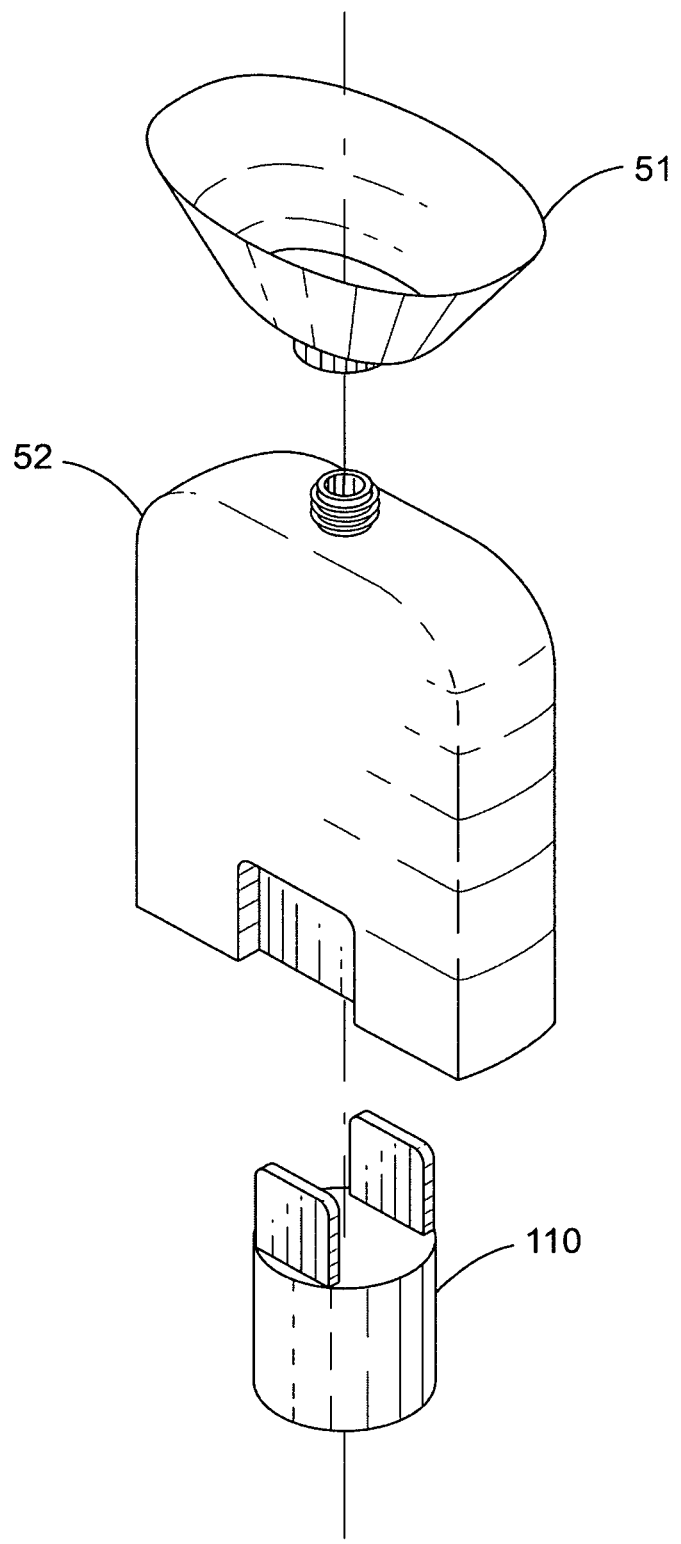
FIG. 13 is an exploded view of a trough, canteen, and adapter in accordance with some aspects of the invention.

An adapter 110 may be provided, as shown schematically in FIG. 11, to allow a flask-shaped bottle to be held securely in a standard cup holder as are generally provided in vehicles for the convenience of the occupants. Stability may be enhanced by adding ridges or channels 120 in the sides of container 52 to engage adapter 110 and lock the assembly together, as shown schematically in FIGS. 12-13. It will be appreciated that, for simplicity, the bottom part of adapter 110 is shown as a right circular cylinder; however, the outer surface may alternatively be tapered somewhat toward the bottom (similarly to the shape of a typical disposable cold drink cup) for easier placement into a variety of cup holders.

EXAMPLE

The bowl may also be fitted with a dip tube and female threaded boss that is compatible with the threads on standard drink bottles, so that the user may buy bottled water, for example, for his/her own use, and when the pet requires water, the user simply takes one of the water bottles and attaches it to the bowl.

It is well known in the field of sports medicine that proper hydration requires not only water replacement but also the replenishment of electrolytes and in some cases carbohydrates. The inventive bowl may therefore be a part of a complete pet support system in which the fluid in the reservoir is not just water but may contain various other helpful additives, such as electrolytes, carbohydrates, vitamins, minerals, etc. Thus, while the term "water" is used herein for convenience, it will be intended to include water that contains any of the aforementioned soluble additives.

EXAMPLE

In the preceding example, it was taught that the inventive bowl may be configured to screw directly onto standard disposable water bottles (typically with 12 fl. oz., 16 fl. oz., or 1 L capacity). Because of this standardization, the bowl may be accompanied by envelopes of powdered additives as described above, with each envelope containing the right amount of concentrate to be added to the selected volume of water. The user can therefore easily take a low-cost bottle of water, add the contents of the envelope, shake, and have a ready supply of scientifically appropriate hydration fluid for the pet.

EXAMPLE

Alternatively, disposable bottles of water with premixed supplements, similar to human sports drinks, may be provided with a threaded closure that is compatible with the threaded boss 55 on the underside of trough 51.

The invention may also be configured as a self-replenishing system with an inverted fluid reservoir.

EXAMPLE

Figure 14:
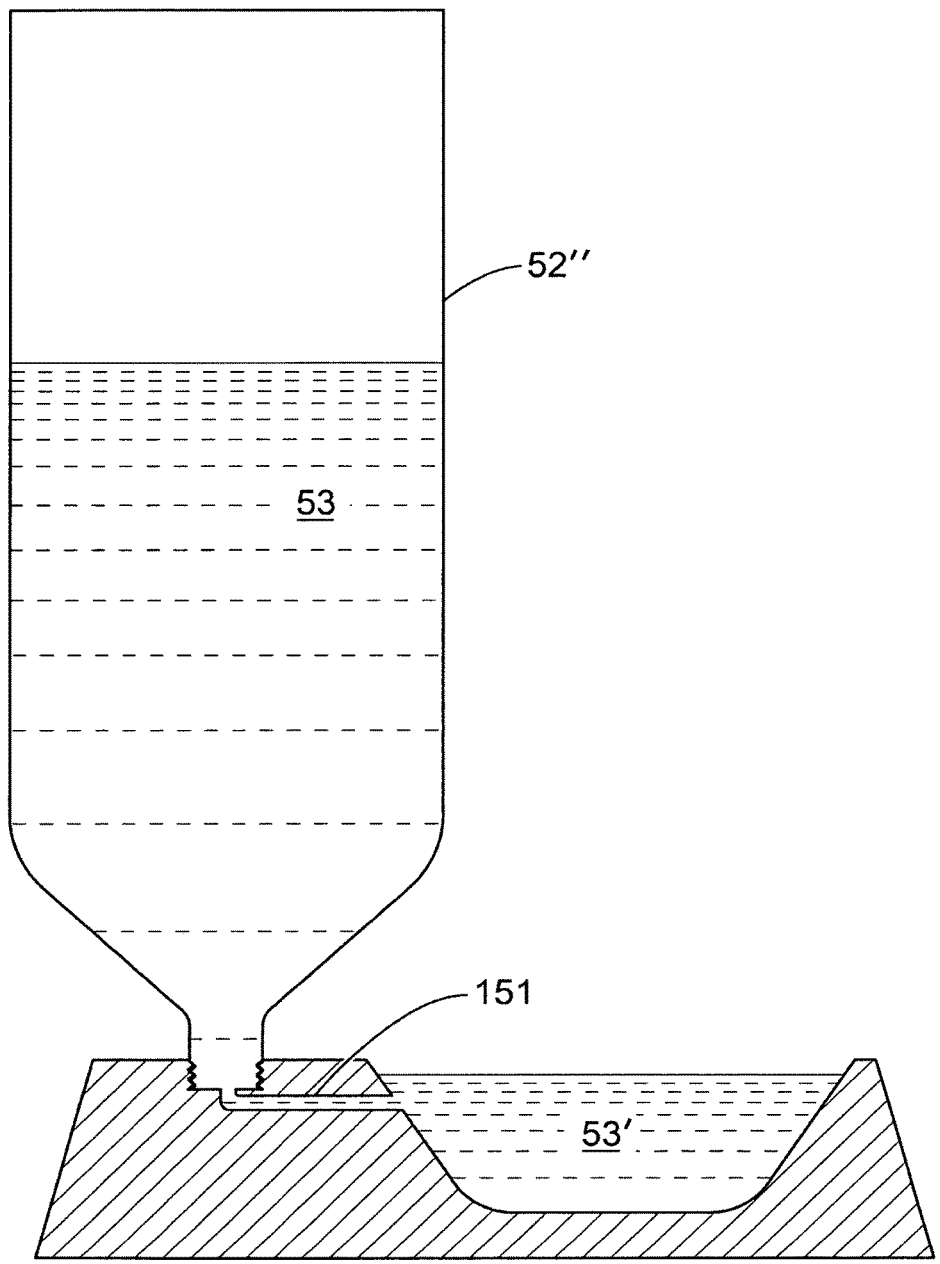
FIG. 14 illustrates schematically another aspect of the invention, in which the fluid reservoir is mounted above the trough and configured to replenish the fluid in the tough by the action of gravity.

As shown generally in FIG. 14, a fluid reservoir 52" may be attached to the trough with the reservoir opening facing downward and connected to a fluid conduit 151 leading into the trough. The reservoir is detached for filling and the trough is attached. Then, the whole assembly is inverted so that the trough is at the bottom. It will be appreciated that the trough will fill with fluid 53' under the action of gravity only until the fluid level reaches the level of the opening of the fluid conduit; at this point, fluid flow ceases because air can no longer enter the reservoir to displace it. As fluid is consumed by the animal and it drops below the opening, fluid 53 will once again flow into the trough to replenish it. The size of the reservoir will preferably have some correspondence to the size of the trough, for several reasons:

First, a larger animal that requires a larger trough will consume more fluid over the course of a day than will a smaller animal that uses a smaller trough. Second, a very large reservoir on a relatively small trough will be somewhat more prone to tipping over, although this risk is partly mitigated by the outwardly-sloping sides of the trough, which expand the footprint for added stability, as described earlier.

The following summary is intended to illustrate several exemplary ranges, variants, modifications, and optional features and designs that may be incorporated in the invention.

According to one aspect of the invention, a system for providing fluid for an animal may comprise:

a vessel having a generally oval plan forming a trough to contain fluid for consumption by an animal, wherein the vertical inner sides of the trough slope inwardly from the upper rim of the trough to the bottom of the trough at an angle that varies around the circumference of the oval, and further comprising:

- an opening in the bottom of the trough in fluid communication with a dip tube that extends into a partially flexible fluid reservoir;
- an attachment means on the underside of the trough by which the fluid reservoir is sealably attached so that when pressure is applied to the reservoir, fluid will flow upward through the dip tube and fill the trough, and when the pressure is released, any remaining fluid will return to the reservoir.

The oval shape of the trough may have an aspect ratio ranging from about 125% to about 200%.

The inner sides of the trough may slope inwardly at an angle from the vertical that varies around the circumference of the oval, with a steeper slope on the sides of the oval and a shallower slope on the ends of the oval. The inner sides preferably form smooth tangents to the curved bottom of the bowl, thereby eliminating internal corners in the trough.

The inward slope on the sides of the oval may range from about 10 to about 30° from vertical, and the inward slope on the ends of the oval may range from about 20 to about 50° from vertical.

The trough may be made of a selected polymer. The polymer may be a thermoplastic or a thermoset and may further include dyes, organic fillers, and inorganic fillers. It may be fabricated by any suitable process, including injection molding, resin transfer molding, casting, machining, and 3D printing.

The trough may be made of an elastomer and may have sufficient flexibility to be everted so that it clasps the shoulders of the reservoir for storage.

The trough may be made from sheet metal and fabricated by stamping, deep drawing, or other convenient means.

The attachment means may include an O-ring and/or a gasket.

The dip tube may contain a valve to prevent outflow when the system is not in use.

The reservoir may include a generally cylindrical, removable adapter to allow it to be held securely in a cup holder, and the reservoir may have surface features to allow secure engagement with the removable adapter The reservoir may include surface features or inserts for various purposes, such as providing a secure gripping surface when wet, indicia such as logos, school or team emblems, military or police insignia, etc. It may further include familiar devices for ease of carrying and use, such as belts, clips, handles, and the like that allow it to be carried, attached to the owner's belt or backpack, clipped onto the animal's leash or collar, etc.

The trough may include a threaded boss of such specifications to accommodate a selected type of bottle, such as: disposable water bottles, sports drink bottles, soft drink bottles, and the like. Industry standards exist for closure threads. The Closure Manufacturers Association (CMA) has published a set of plastic closure thread standards. This standard is synchronized with the SPI Plastic Bottle standard. Industry standards likewise exist for bottle threads. The Society of the Plastics Industry (SPI)—Plastic Bottle Institute has published a set of plastic bottle thread standards. This standard is synchronized with the CMA closure standard. Many such standard threads will be suitable for joining the trough to the reservoir, as they are well known to manufacturers and are easily made by standard production methods used in the art. Many sealing arrangements are likewise well known in the art, and may be used as needed in adapting the invention to a particular situation through routine experimentation.

The fluid reservoir may contain: tap water, distilled water, spring water, and potable water; and may further include, in solution, one or more selected additives or supplements, such as vitamins, minerals, carbohydrates, electrolytes, amino acids, flavorings, and compounds for cartilage support such as glucosamine and its derivatives and chondroitin and its derivatives.

A separate package may be provided that contains powdered or concentrated supplements in a premeasured quantity to be added to a reservoir of a particular size that is filled with water into which the supplements are dissolved before consumption.

According to another aspect of the invention, a method for watering an animal comprises the steps of:

a) forming a trough having a generally oval shape whose minor axis is less than the distance between a selected animal's ears, and whose major axis is at least 125% of the minor axis, wherein:

- the vertical inner sides of the trough slope inwardly from the upper rim of the trough to the bottom of the trough at an angle that varies around the circumference of the oval;
- an opening is provided in the bottom of the trough in fluid communication with a dip tube that extends into a flexible fluid reservoir;
- an attachment means is provided on the underside of the trough by which the fluid reservoir is sealably attached so that when pressure is applied to the reservoir, fluid will flow upward through the dip tube and fill the trough, and when the pressure is released, any remaining fluid will return to the reservoir;

b) placing fluid to be consumed by the animal into the reservoir;

c) applying pressure to the reservoir to displace fluid into the trough;

d) positioning the trough so that the animal will approach the trough from the direction parallel to the long axis of the oval and consume fluid therefrom; and, e) releasing pressure on the reservoir so that unconsumed fluid will return to the reservoir.

I claim:

1. A method for watering an animal comprising the steps of:

a) forming a trough having a generally oval shape whose width along the minor axis of said oval shape is less than the distance between a selected animal's ears, and whose length along the major axis of said oval shape is at least 125% of said width along the minor axis, wherein: the vertical inner sides of the trough slope inwardly from the upper rim of the trough to the bottom of the trough at an angle that varies around the circumference of said oval shape;

an opening is provided in the bottom of the trough in fluid communication with a dip tube that extends into a flexible fluid reservoir;

an attachment means is provided on the underside of the trough by which the fluid reservoir is sealably attached so that when pressure is applied to the reservoir, fluid will flow upward through the dip tube and fill the trough, and when the pressure is released, any remaining fluid will return to the reservoir;

b) placing fluid to be consumed by the animal into the reservoir;

c) applying pressure to the reservoir to displace fluid into the trough;

d) positioning the trough so that the animal will approach the trough from the direction parallel to the major axis of the oval shape and consume fluid therefrom; and, e) releasing pressure on the reservoir so that unconsumed fluid will return to the reservoir.

2. The method of claim 1 wherein said trough comprises an injection molded thermoplastic polymer.

3. The method of claim 1 wherein the inner surface of said trough slopes inwardly at an angle from the vertical that varies around the circumference of said oval shape, with a steeper slope on the sides of said oval shape and a shallower slope on the ends of said oval shape.

4. The method of claim 3 wherein said inward slope on the side of said oval shape is about 10° to about 30° from the vertical, and said inward slope on the end of said oval shape is about 20° to about 50° from the vertical.

5. The method of claim 1 wherein said inner surface of said trough has a generally rounded bottom in order to eliminate internal corners.

6. The method of claim 1 wherein said fluid comprises water.

7. The method of claim 6 further comprising the step of:
f) adding an effective concentration of a soluble additive to said water in said reservoir.

8. The method of claim 7 wherein said soluble additive comprises at least one supplement selected from the group consisting of: carbohydrates, electrolytes, vitamins, minerals, amino acids, chondroitin and its derivatives, glucosamine and its derivatives, and flavorings.

* * * * *